United States Patent
Lattner et al.

(10) Patent No.: US 8,645,930 B2
(45) Date of Patent: Feb. 4, 2014

(54) SYSTEM AND METHOD FOR OBFUSCATION BY COMMON FUNCTION AND COMMON FUNCTION PROTOTYPE

(75) Inventors: Christopher Arthur Lattner, San Jose, CA (US); Tanya Michelle Lattner, San Jose, CA (US); Julien Lerouge, Santa Clara, CA (US); Ginger M. Myles, San Jose, CA (US); Augustin J. Farrugia, Cupertino, CA (US); Pierre Betouin, Boulogne (FR)

(73) Assignee: Apple Inc., Cupertino, CA (US)

( * ) Notice: Subject to any disclaimer, the term of this patent is extended or adjusted under 35 U.S.C. 154(b) by 1068 days.

(21) Appl. No.: 12/651,953

(22) Filed: Jan. 4, 2010

(65) Prior Publication Data

US 2011/0167414 A1 Jul. 7, 2011

(51) Int. Cl.
*G06F 9/44* (2006.01)
*G06F 9/45* (2006.01)

(52) U.S. Cl.
USPC ........... 717/140; 717/103; 717/104; 717/106; 717/120; 717/124; 717/131; 717/136; 717/148

(58) Field of Classification Search
None
See application file for complete search history.

(56) References Cited

U.S. PATENT DOCUMENTS

| | | | |
|---|---|---|---|
| 6,668,325 B1 | 12/2003 | Collberg et al. | |
| 7,032,221 B1* | 4/2006 | Chapman et al. | 718/100 |
| 7,779,394 B2* | 8/2010 | Horning et al. | 717/136 |
| 7,797,245 B2* | 9/2010 | Pedersen | 717/131 |
| 7,971,255 B1* | 6/2011 | Kc et al. | 726/24 |
| 2003/0208743 A1* | 11/2003 | Chong et al. | 717/106 |
| 2004/0243978 A1* | 12/2004 | Walmsley | 717/120 |
| 2005/0050396 A1* | 3/2005 | Thornborson et al. | 714/38 |
| 2005/0204348 A1* | 9/2005 | Horning et al. | 717/140 |
| 2005/0289264 A1* | 12/2005 | Illowsky et al. | 710/104 |
| 2005/0289508 A1* | 12/2005 | Illowsky et al. | 717/106 |
| 2005/0289527 A1* | 12/2005 | Illowsky et al. | 717/148 |
| 2006/0020912 A1* | 1/2006 | Illowsky et al. | 717/103 |
| 2008/0022262 A1* | 1/2008 | Prakash et al. | 717/124 |
| 2008/0127078 A1* | 5/2008 | Nam et al. | 717/120 |
| 2008/0168421 A1* | 7/2008 | Meijer et al. | 717/106 |
| 2010/0281459 A1* | 11/2010 | Betouin et al. | 717/106 |

OTHER PUBLICATIONS

Henry Hanping Feng et al., Anomaly Detection Using Call Stack Information, IEEE 2003, [Retrieved on Apr. 24, 2013]. Retrieved from the internet: <URL: http://www-unix.ecs.umass.edu/~gong/papers/ok_idpc.pdf> 14 pp. 1-14.*

(Continued)

*Primary Examiner* — Don Wong
*Assistant Examiner* — Anibal Rivera
(74) *Attorney, Agent, or Firm* — Womble Carlyle Sandridge & Rice LLP

(57) ABSTRACT

Disclosed herein are systems, methods, and computer-readable storage media for obfuscating by a common function. A system configured to practice the method identifies a set of functions in source code, generates a transformed set of functions by transforming each function of the set of functions to accept a uniform set of arguments and return a uniform type, and merges the transformed set of functions into a single recursive function. The single recursive function can allocate memory in the heap. The stack can contain a pointer to the allocated memory in the heap. The single recursive function can include instructions for creating and explicitly managing a virtual stack in the heap. The virtual stack can emulate what would happen to the real stack if one of the set of functions was called. The system can further compile the source code including the single recursive function.

17 Claims, 5 Drawing Sheets

(56) References Cited

OTHER PUBLICATIONS

Lee Badger et al., Self-Protecting Mobile Agents Obfuscation Techniques Evaluation Report, Nov. 30, 2001, [Retrieved on Apr. 24, 2013]. Retrieved from the internet: <URL: http://www.au.af.mil/au/awc/awcgate/darpa/obfreport.pdf> 62 pp. 1-62.*

Arun Lakhotia et al., A Method for Detecting Obfuscated Calls in Malicious Binaries, Nov. 2005, [Retrieved on Sep. 18, 2013]. Retrieved from the internet: <URL: http://ieeexplore.ieee.org/stamp/stamp.jsp?tp=&arnumber=1556554> 14 pp. 955-968.*

Sergio Maffeis et al., Language-Based Isolation of Untrusted KavaScript, 2009, [Retrieved on Sep. 18, 2013]. Retrieved from the internet: <URL: http://ieeexplore.ieee.org/stamp/stamp.jsp?tp=&arnumber=5230484> 15 pp. 77-91.*

G. Eberhardt, Z. Nagy, E. Jeges and Z. Hornák, "Copy Protection Through Software Watermarking and Obfuscation," Scientific Association for Infocommunications, Jan. 2007, pp. 2-7, vol. LXII, Budapest, Hungary (Available online at http://www.hiradastechnika.hu/data/upload/file/2007/2007_1a/HT_0701a-2.pdf, last visited Jan. 4, 2010).

Joshua A. Benson, "Software Protection Against Reverse Engineering Tools," Air Force Institute of Technology, Wright-Patterson AFB, Ohio, School of Engineering and Management, Master's Thesis, Mar. 2007 (Available online at http://www.dtic.mil/cgi-bin/GetTRDoc?AD=ADA469485&Location=U2&doc=GetTRDoc.pdf, last visited Jan. 4, 2010).

S. Chow, P. Eisen, H. Johnson and P.C. van Oorschot, "A White-Box DES Implementation for DRM Applications," Lecture Notes in Computer Science, Digital Rights Management, Oct. 10, 2002, pp. 1-15, vol. 2696/2003.

* cited by examiner

SYSTEM AND METHOD FOR OBFUSCATION BY COMMON FUNCTION AND COMMON FUNCTION PROTOTYPE

BACKGROUND

1. Technical Field

The present disclosure relates to code obfuscation and more specifically to obfuscating source code using a common function.

2. Introduction

Software publishers often attempt to restrict access to portions of compiled software executables to thwart would-be reverse engineering while still allowing the executables to function properly. Reverse engineering is the practice of dissecting and/or analyzing software to understand how it works. On certain systems, reverse engineering can retrieve information stored within software such as information related to cryptographic keys or copy protection schemes. Reverse engineers can even tamper with the software itself or call specific portions of the software for their own unauthorized purposes.

One approach to thwart reverse engineering and other attacks is to reduce the number of entry points into a dynamically linked library (DLL). This can be accomplished by in-lining tasks that were previously separate functions. For large functions or commonly used functions however, this approach quickly leads to code bloat and can exceed stack and function size limits. Such code can be difficult to maintain because a single change must be propagated through all the in-lined portions of the code. Further, an attacker could compare portions of the code which are the same (i.e. in-lined) for clues as to the code's purpose and how it is used.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed are systems, methods, and computer-readable storage media for obfuscating by a common function. A system configured to practice the method identifies a set of functions in source code, generates a transformed set of functions by transforming each function of the set of functions to accept a uniform set of arguments and return a uniform type. In other words, the functions share the same function prototype. Then the system merges the transformed set of functions into a single recursive function. The single recursive function can allocate memory in the heap. The stack can contain a pointer to the allocated memory in the heap. The single recursive function can include instructions for creating and explicitly managing a virtual stack in the heap. The virtual stack can emulate what would happen to the real stack if one of the set of functions was called. The system can further compile the source code including the single recursive function.

In one aspect, a computer-readable storage medium stores a computer program with instructions for recursively accessing a common function created by the steps outlined above. One of the arguments or a part of an argument can indicate a subfunction within the common function to be executed. The function calls can include direct and indirect function calls. Function calls in the common function can be replaced with jump instructions to a specific location within the single large function. Such jump instructions can include return instructions or a return address for processing after the jump. The computer program can be one large recursively-called common function. The computer program can access the common function as an embedded part of the computer program or the common function can be stored separately from the computer program.

In another aspect, the system creates a structure for each function in a given program that contains an element for each parameter passed to the function and the return value for the function. Then the system modifies each function in the program so that they share the same return type, which may be void, and the same number parameters, which may be a single pointer. Inside each function, the system changes how the parameters are used so they get their values from the structure referenced by the single pointer. If the function returns a value, the system changes the function so that the return value is inserted as a value within a structure accessed by the passed pointer.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Figure 1:
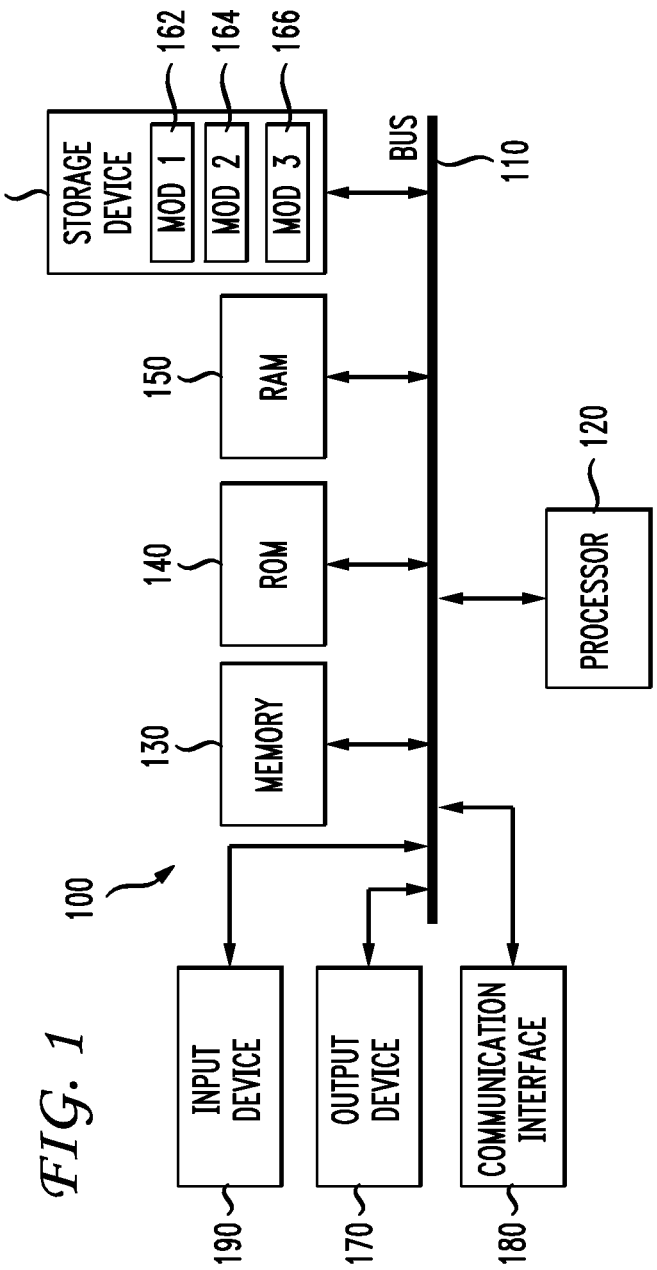
FIG. 1 illustrates an example system embodiment.

With reference to FIG. 1, an exemplary system 100 includes a general-purpose computing device 100, including a processing unit (CPU or processor) 120 and a system bus 110 that couples various system components including the system memory 130 such as read only memory (ROM) 140 and random access memory (RAM) 150 to the processor 120. These and other modules can be configured to control the processor 120 to perform various actions. Other system memory 130 may be available for use as well. It can be appreciated that the disclosure may operate on a computing device 100 with more than one processor 120 or on a group or cluster of computing devices networked together to provide greater processing capability. The processor 120 can include any general purpose processor and a hardware module or software module, such as module 1 162, module 2 164, and module 3 166 stored in storage device 160, controlling the processor 120 as well as a special-purpose processor where software instructions are incorporated into the actual processor design. The processor 120 may essentially be a completely self-contained computing system, containing multiple cores or processors, a bus, memory controller, cache, etc. A multi-core processor may be symmetric or asymmetric.

The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices 160 such as a hard disk drive, a magnetic disk drive, an optical disk drive, tape drive or the like. The storage device 160 can include software modules 162, 164, 166 for controlling the processor 120. Other hardware or software modules are contemplated. The storage device 160 is connected to the system bus 110 by a drive interface. The drives and the associated computer readable storage media provide nonvolatile storage of computer readable instructions, data structures, program modules and other data for the computing device 100. In one aspect, a hardware module that performs a particular function includes the software component stored in a tangible and/or intangible computer-readable medium in connection with the necessary hardware components, such as the processor 120, bus 110, display 170, and so forth, to carry out the function. The basic components are known to those of skill in the art and appropriate variations are contemplated depending on the type of device, such as whether the device 100 is a small, handheld computing device, a desktop computer, or a computer server.

Although the exemplary embodiment described herein employs the hard disk 160, it should be appreciated by those skilled in the art that other types of computer readable media which can store data that are accessible by a computer, such as magnetic cassettes, flash memory cards, digital versatile disks, cartridges, random access memories (RAMs) 150, read only memory (ROM) 140, a cable or wireless signal containing a bit stream and the like, may also be used in the exemplary operating environment. Tangible computer-readable storage media exclude media such as energy, carrier signals, electromagnetic waves, and signals per se.

To enable user interaction with the computing device 100, an input device 190 represents any number of input mechanisms, such as a microphone for speech, a touch-sensitive screen for gesture or graphical input, keyboard, mouse, motion input, speech and so forth. The input device 190 may be used by the presenter to indicate the beginning of a speech search query. An output device 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on operating on any particular hardware arrangement and therefore the basic features here may easily be substituted for improved hardware or firmware arrangements as they are developed.

For clarity of explanation, the illustrative system embodiment is presented as including individual functional blocks including functional blocks labeled as a "processor" or processor 120. The functions these blocks represent may be provided through the use of either shared or dedicated hardware, including, but not limited to, hardware capable of executing software and hardware, such as a processor 120, that is purpose-built to operate as an equivalent to software executing on a general purpose processor. For example the functions of one or more processors presented in FIG. 1 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 140 for storing software performing the operations discussed below, and random access memory (RAM) 150 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 100 shown in FIG. 1 can practice all or part of the recited methods, can be a part of the recited systems, and/or can operate according to instructions in the recited tangible computer-readable storage media. Generally speaking, such logical operations can be implemented as modules controlling the processor 120 to perform particular functions according to the programming of the module. For example, FIG. 1 illustrates three modules Mod1 162, Mod2 164 and Mod3 166 which are modules controlling the processor 120. These modules may be stored on the storage device 160 and loaded into RAM 150 or memory 130 at runtime or may be stored as would be known in the art in other computer-readable memory locations.

Figure 2:
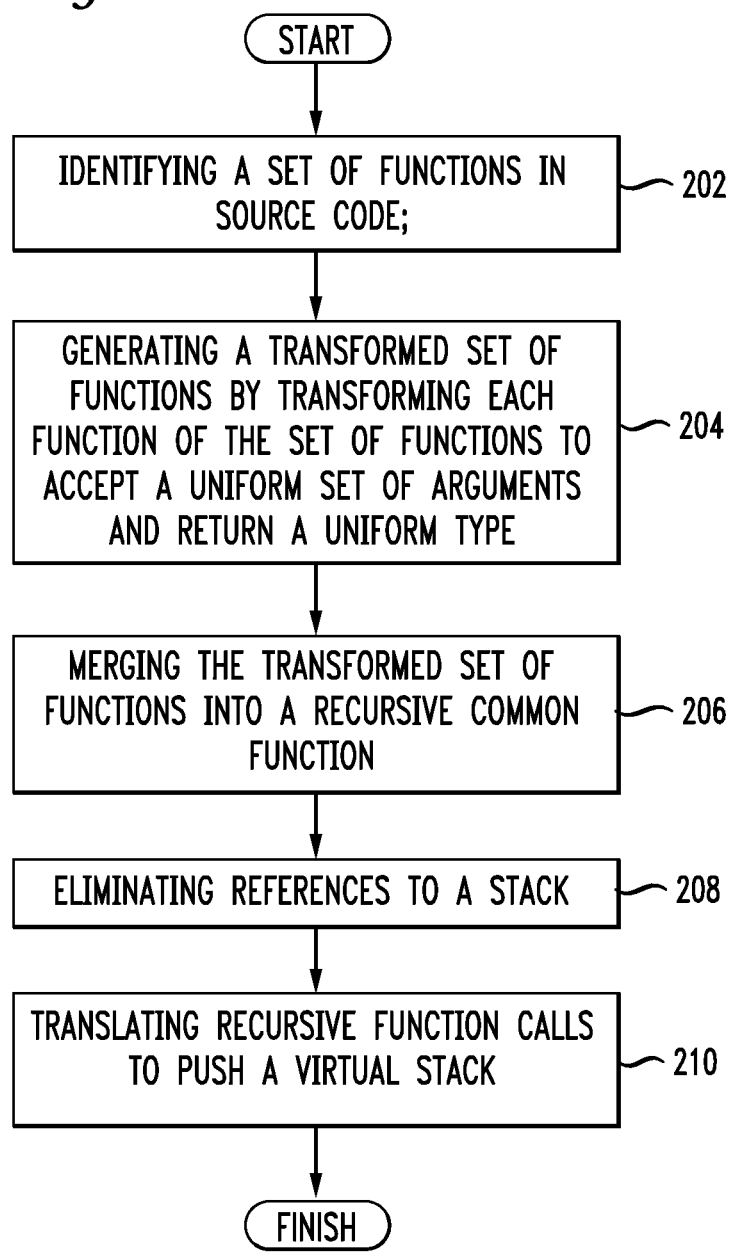
FIG. 2 illustrates an example method embodiment.

Having disclosed some basic system components, the disclosure now turns to the exemplary method embodiment shown in FIG. 2. For the sake of clarity, the method is discussed in terms of an exemplary system such as is shown in FIG. 1 configured to practice the method.

FIG. 2 illustrates an example method embodiment for obfuscating by common function. The suitably configured system 100 can perform any and/or all the steps of the method. First, the system identifies a set of functions in source code (202). The functions typically include one or more passed argument types, instructions to process the passed arguments, and a return value. Below are two simple example functions. The first function receives two integers x1 and x2 and adds them together and returns an integer result. The second function receives two floating point numbers y1 and y2 and returns a floating point result of y1 divided by y2:

```
int Add (int x1, int x2)
{
    int i_result = x1 + x2;
    return i_result;
}
float Divide (float y1, float y2)
{
    float f_result = y1 / y2;
    return f_result;
}
```

The system 100 generates a transformed set of functions by transforming each function of the set of functions to accept a uniform set of arguments and return a uniform type (204). For example, the system 100 can transform both a function that accepts an integer argument and a function that accepts a float argument to functions that accept a struct, or a data type made up of one or more other data types. In this case, the struct can include an integer and a floating point number. Below is example C code for declaring such a struct with regards to the two functions above:

```
struct smoosh
{
    int x1, x2;
    float y1, y2;
}
```

The two simple example functions above can be modified to use the struct "smoosh" as shown below:

```
smoosh Add (smoosh input)
{
    smoosh result;
    result.x1 = input.x1 + input.x2;
    return result;
}
smoosh Divide (smoosh input)
{
    smoosh result;
    result.y1 = input.y1 / input.y2;
    return result;
}
```

In this manner, both functions can receive the information they need (i.e. two integers or two floating point numbers), but the passed argument and the returned type is the same (i.e. the 'smoosh' struct). The system 100 then merges the transformed set of functions into a single recursive function (206). For example, the system 100 can include an index or other unique identifier in the transformed function arguments to identify which of the merged functions is to receive and process a function call. The single recursive function can allocate memory from the available unused memory.

In general terms, a stack is a data structure where data is first in, last out. Many modern processors include registers for use as stack pointers to sets of instructions. Specifically, the Intel x86 and x86-64 architectures include special instructions that implicitly use a dedicated register as a stack pointer. A push operation adds an element to the top of the stack and a pop operation removes an item from the top of the list or the stack. The heap as it is generally used herein refers to the unused memory area or free store of memory. The heap allows for dynamic memory allocation for use in a computer program during the runtime of that program. Some languages (such as C++) allow a programmer to manually manage dynamic allocations and releases, while other languages use garbage collection to handle releasing dynamically allocated memory. Usually, a program allocates memory from a pool of unused memory (the heap).

The system 100 can eliminate references to the stack (208). One motivation to eliminate references to the stack is to avoid running out of stack space. Another motivation to eliminate references to the stack is to make the machine stack trace completely flat. A stack trace can show where an error occurs in a program or a calling function. However, the stack can contain a pointer to the allocated memory in the heap.

The system 100 can translate recursive function calls to push or use a virtual stack (210). The virtual stack can be created in the heap. In one aspect, the system 100 explicitly manages the virtual stack to emulate what would happen if one of the set of functions was called normally. For example, the system 100 can use a portion of the heap as a virtual stack by pushing variables on to and popping variables off from the virtual stack. Because the virtual stack is explicitly managed, an attacker can not perform a stack trace (such as with a debugger) to determine which variables were passed, which functions were called, etc. at a given point during the program execution. Further, the system 100 can compile the source code including the single recursive function. The principles described in FIG. 2 can be applied to other embodiments as well, such as a system for converting source code having a set of functions to obfuscated source code or a computer-readable storage medium storing a computer program including obfuscated portions.

A system 100 for converting clear source code to obfuscated source code can identify a set of functions in source code, generate a transformed set of functions by transforming each function of the set of functions to accept a uniform set of arguments and return a uniform type, merge the transformed set of functions into a single large function which can be recursive, and replace calls to each of the identified set of functions with a corresponding call to the single large function. One argument in the uniform set of arguments can indicate one of the previously separate functions in the single large function to be executed. Function calls to one of the set of functions can include direct and indirect calls. The system 100 can replace function calls in the source code with a jump instruction to a specific location within the single large function. The code snippets below provide specific examples of replacing the function calls with jump or goto instructions. In another aspect, a single program (which may or may not include its supporting libraries and resources) can contain multiple embedded common functions. The common function can be embedded in a set of computer instructions or code or stored separately, such as in a standalone file or library.

Figure 3:
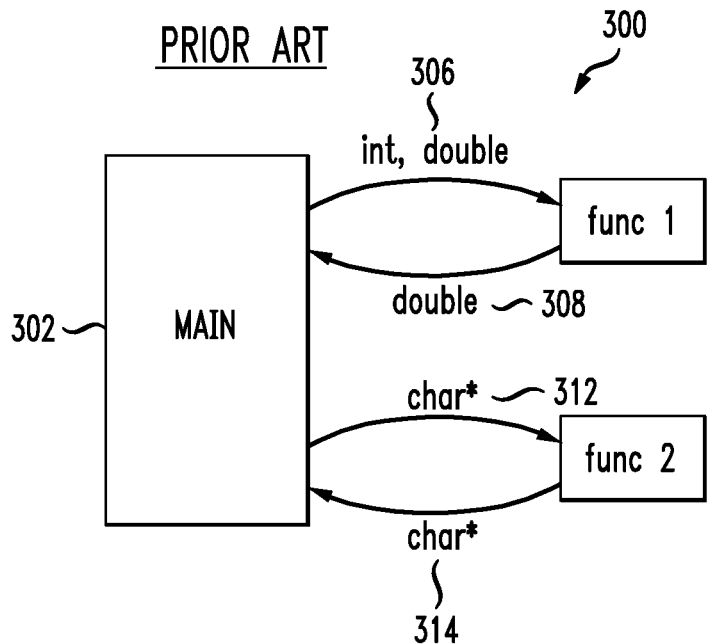
FIG. 3 illustrates an exemplary approach to calling different functions.

FIG. 3 illustrates a prior art approach to calling different functions. In this approach 300, a main function 302 calls a function 1 by passing it variables 306, such as an integer and a double. Function 1 processes the input variables and passes a double return value 308 to the main function 302. Main or function 1 can call other functions in a similar way. For example, main function 302 calls function 2 by passing it a char* 312 (a character). Function 2 processes the input char* and returns a char* 314 to the main function 302. However, as described above, this example provides multiple entry points into an executable or DLL.

Figure 4:
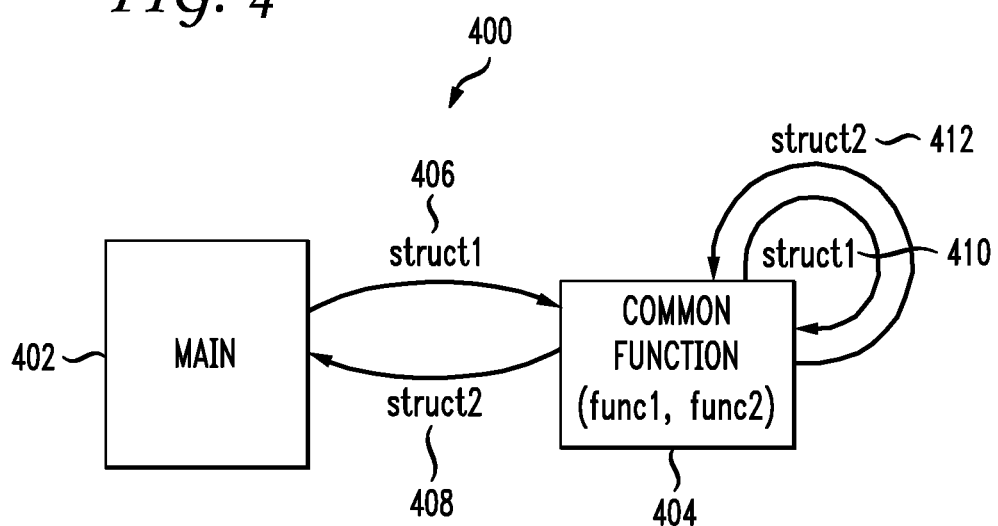
FIG. 4 illustrates an exemplary approach to obfuscating by common function.

FIG. 4 illustrates an exemplary approach 400 to obfuscating by common function. In this example, the main code 402 calls a common function 404 including the function 1 code, the function 2 code, and any other functions with the same prototype or signature. In other words, the common function accepts and returns the same variable types. As discussed above, one approach to modify the functions to have the same function prototype is to use a struct having data elements which match the parameter types of the individual functions. In this case, an example struct1 406 for input parameters can include an integer, a double, and a char* (or the combined input variables 306, 312 for func 1 and func 2, as shown in FIG. 3). An example struct2 408 for the return values can include a double and a char* (or the combined output variables 308, 314 for func 1 and func 2, as shown in FIG. 3). When the main code 402 needs to call one of the functions in the common function, it calls the common function 404 and passes parameters in struct1 406, at least one of which indicates which portion of the common function 404 to execute. The common function 404 can return a struct2 408 to main 402. In some cases, the common function can recursively call itself, passing a struct1 410 and receiving a struct2 412. This situation is analogous to func 1 in FIG. 3 calling func 2. This approach can eliminate all or nearly all references to the stack and translate the recursive calls to push the virtual stack. The result is an obfuscated resulting function and stack at execution time.

In order to transform all the functions to have the same signature, each function must have the same prototype. Further, each function can have a unique index. A system 100 making such a common function can then merge the arguments using unions and merge the return values using unions. The following code snippets illustrate functions foo and bar, a unioned struct to unify the arguments and return values, and the modified functions foo and bar based on the struct. In this example, the return type is modified to be void so that the calling program obtains the return value through the struct M to which the passed *M points.

```
int foo(int A)
{
    return A+4;
}
struct xxx bar(float F)
{
    struct xxx result;
    int tmp = foo(4);
    result.val = tmp;
    return result;
}
struct merged
{
    union
    {
        int foo_result;
        struct xxx bar_result;
    } result;
    union
    {
        int foo_A;
        float bar_F;
    } args;
}
void foo(merged *M)
{
    int A = M->args.foo_A;
    M->foo_result = A+4;
}
void bar(merged *M)
{
    float F = M->args.bar_F;
    struct xxx result;
    merged foo_args;
    foo_args.args.foo_A = 4;
    foo(&foo_args);
    int tmp = foo_args.foo_result;
    result.val = tmp;
    M->result.bar_result = result;
}
```

Figure 5:
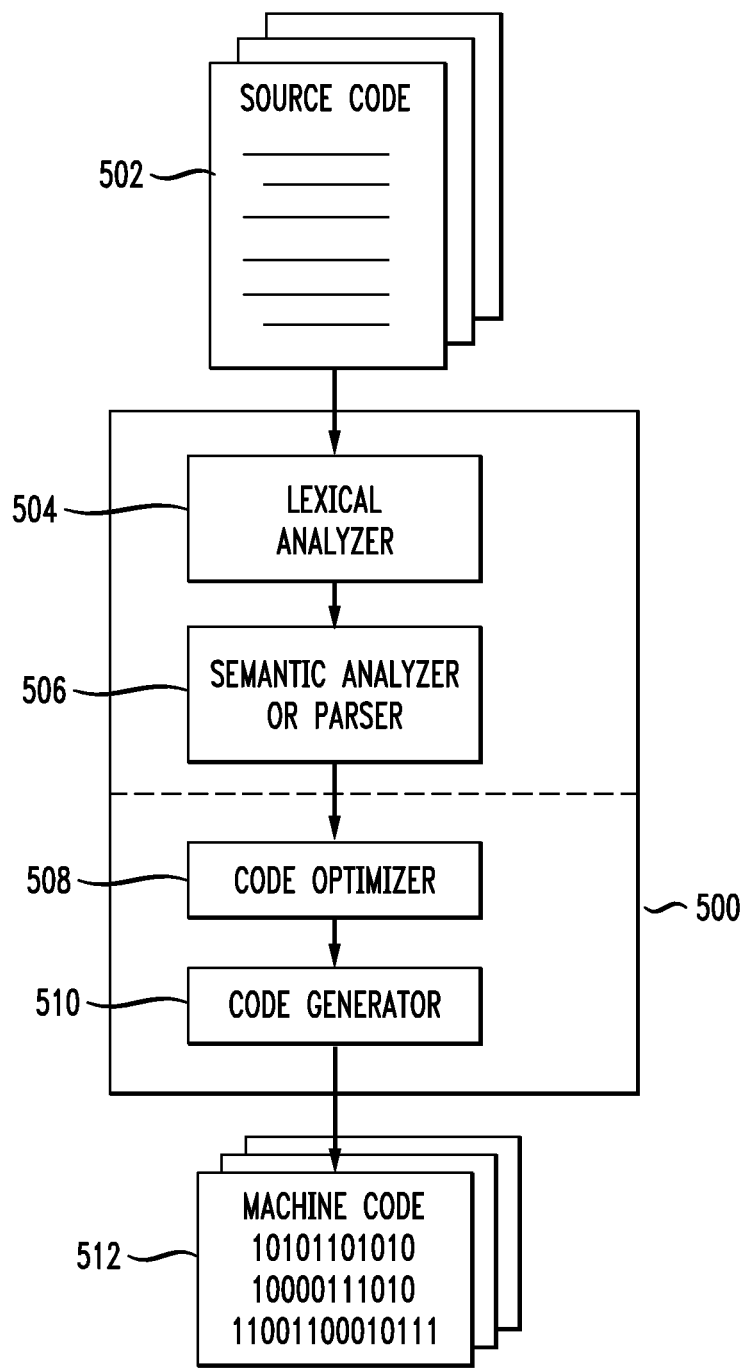
FIG. 5 illustrates a block diagram of an exemplary compiler.

A compiler as described in FIG. 5 and/or another tool can join these modified functions into one large, common function, as shown below. However, when this approach executes on a computing device, the computing device will very likely run out of stack space.

```
void foo(merged *M)
{
    int A = M->args.foo_A;
    M->foo_result = A+4;
}
void bar(merged *M)
{
    float F = M->args.bar_F;
    struct xxx result;
    merged foo_args;
    foo_args.args.foo_A = 4;
    foo(&foo_args);
    int tmp = foo_args.foo_result;
    result.val = tmp;
    M->result.bar_result = result;
}
void func(merged *M, int dest)
{
    switch (dest)
    {
        case 1:
            int A = M->args.foo_A;
            M->foo_result = A+4;
            return;
        case 2:
            ...
            merged foo_args;
            foo_args.args.foo_A = 4;
            func(&foo_args, 1);
            int tmp = foo_args.foo_result;
            ...
    }
}
```

One approach to resolve the problem of running out of stack space is to eliminate all references to the stack. The code below illustrates one possible approach that eliminates all references to the stack.

```
void func(merged *M, int dest)
{
    ...
    merged foo_args;
    foo_args.args.foo_A = 4;
    func(&foo_args, 1);
    int tmp = foo_args.foo_result;
    ...
}
void func(merged *M, int dest)
{
    StackFrame *Top = null;
    {
        StackFrame *New = malloc(...);
        New->M = M;
        New->dest = dest;
        New->Next = Top;
        Top = New;
    }
    ...
    merged foo_args;
    Top->foo_args.args.foo_A = 4;
    func(&Top->foo_args, 1);
    Top->tmp = foo_args.foo_result;
    ...
}
```

Further, a compiler can translate the recursive calls to push the virtual stack by converting all calls to a push and a recursive goto statement and converting all return statements to a pop and goto statement. The example code below illustrates one way to implement function calls using this approach.

```
void func(merged *M, int dest)
{
    StackFrame *Top = null;
    {
        StackFrame *New = malloc(...);
        New->M = M;
        New->dest = dest;
        New->Next = Top;
        Top = New;
    }
    ...
    Top->foo_args.args.foo__A = 4;
    func(&Top->foo_args, 1);
    Top->tmp = foo_args.foo__result;
    ...
}
void func(merged *M, int dest)
{
    StackFrame *Top = null;
    ReturnPoint = 0;
    Recurse:
    {
        StackFrame *New = malloc(...);
        New->ReturnPoint = ReturnPoint;
        <same>
    }
    ...
    Top->foo_args.args.foo__A = 4;
    M = &Top->foo_args;
    dest = 1;
    ReturnPoint = 4;
    goto Recurse;
label4:
    Top->tmp = foo_args.foo__result;
    ...
}
```

The example code below illustrates one way to implement returns from function calls using this approach.

```
void func(merged *M, int dest)
{
    ...
    return;
}
void func(merged *M, int dest)
{
    ....
    goto ReturnBlock
ReturnBlock:
    if (Top->Next == 0)
    {
        *M = Top->M;
        free(Top);
        return;
    }
    Next = Top->Next;
    int ReturnPoint = Top->ReturnPoint;
    free(Top);
    Top = Next;
    switch (ReturnPoint)
    {
    case 4: goto Label4;
    ...
    }
}
```

At this point, a compiler has obfuscated the resulting function and stack. The compiler has converted (smooshed) several separately callable functions into a common function with exactly one entry point. In one variation, the code can encrypt the stack on push and decrypt the stack on pop. The machine stack trace is completely flat because the function calls are replaced with goto statements. A programmer, the compiler or the code itself can still apply data transformations and other data manipulations. In one variation of the principles disclosed herein, the resulting common function can handle indirect function calls as well as direct function calls. A single computer program can include more than one common function. Multiple common functions can incorporate completely separate functionality, or some or all of the merged functions can be included in different common functions. For example, if source code includes functions ABC-DEF, one common function can include functions ABC and a second common function can include functions DEF. In an example of sharing functionality, a first common function can include functions ACEF and a second common function can include functions BDEF. In one aspect, this functionality duplication can be used to enhance security or performance. For example, one common function can be optimized for performance, and another common function can be optimized using encryption and/or other obfuscation techniques for security purposes, but with a performance penalty. The system can select one or the other implementation based on desired performance characteristics, security requirements, explicit flags, and/or other considerations.

The obfuscation principles described herein can be combined with one or more other obfuscation approaches in order to provide additional layers of complexity to confuse attackers and increase the cost and/or time required to understand and extract information from compiled code.

Any or all of the steps and/or modules can be integrated with or interact with a compiler. FIG. 5 illustrates a block diagram of an exemplary compiler 500. The modules and elements of the exemplary compiler 500 can be modified and/or added to in order to implement the obfuscation by common function principles disclosed above. A compiler 500 converts human-readable source code 502 to object code or machine code 512 which is understandable to and typically executable by a computing device 100. In one aspect, the source code 502 represents object code or machine code that has the obfuscation steps applied to generate modified object or machine code 512. A compiler 500 typically performs the following representative operations as well as other operations: lexical analysis 504, preprocessing, parsing 506, semantic analysis 506, code optimization 508, and code generation 510. Compilers allow programmers to write software using high level languages and convert those high level instructions to binary machine code 512.

The compiler 500 takes as input source code 502 for a computer program written in a programming language like Perl, Objective-C, Java, etc. Source code can also include other lower or higher level computer instructions as well as intermediate compiler outputs, for example. The compiler 500 passes the code to the front end of the compiler 500 which includes the lexical analyzer 504 and the semantic analyzer or parser 506. At this stage or at any other stage in the compiler 500, a module shown or not shown can perform all or part of the steps outlined above. The compiler 500 then operates on the source 502 in the back end, which includes the code optimizer 508 and the code generator 510. Often the division between the front end and the back end of a compiler is somewhat blurred. The compiler 500 can include other modules and can appear in different configurations. Other possible front end components include a preprocessing module and a semantic analysis module. The front end produces an intermediate representation of the code which is passed to the back end of the compiler 500. The back end of a compiler 500 can include an optimizer 508 and a code generator 510. Finally, the code generator 510 produces machine code 512 or object code. A linker, not shown, can combine the output 512 from several related compiled projects into a single executable file. An obfuscation tool separate from the compiler 500 can process the machine code 512 according to all or part of the steps outlined above to produce modified or obfuscated machine code. Likewise, an obfuscation tool can operate on source code 502 to produce modified or obfuscated source code which is passed to a regular, unmodified compiler 500. In one aspect, a module in the compiler, a pre-processing tool, and/or a post-processing tool operating together perform the overall task of obfuscation based on discrete logarithm data transforms. Other compiler components and modules can be added within the spirit and scope of this disclosure.

Figure 6:
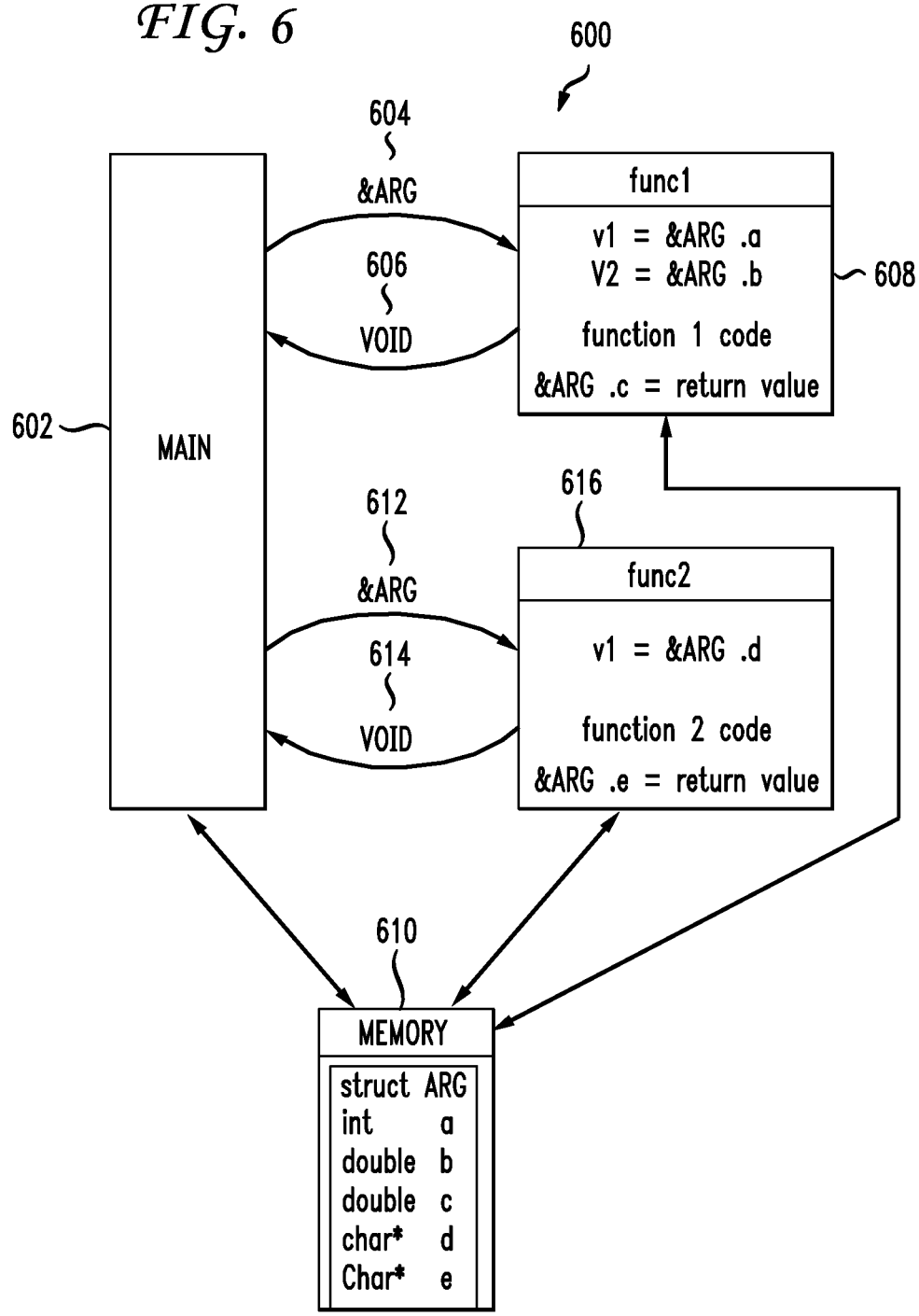
FIG. 6 illustrates an exemplary approach to obfuscating by common function prototype.

FIG. 6 illustrates an exemplary approach 600 to obfuscating by common function prototype. In this approach, the system creates a structure for each function in a given program that contains an element for each parameter passed to the function and the return value for the function. Then the system modifies each function in the program so that they share the same return type, which may be void, and the same number parameters, which may be a single pointer. Inside each function, the system changes how the parameters are used so they get their values from the structure referenced by the single pointer. If the function returns a value, the system can change the function so that the return value is inserted as a value within a structure accessed by the passed pointer. In one aspect, the system organizes functions into sets of common function prototypes. In another aspect, the system creates a common function prototype of more than one data structure.

As stated above, the function prototype uniformity approach can be used by itself without combining the functions into one large function. When a number of functions share the same function prototype, or parameter and return value types, an attacker encounters significant difficulty distinguishing one function from another. In this approach, the system 100 creates and/or executes a main function 602. A data structure or set of data structures replaces the original, unmodified parameters and return values associated with function1 and function2 as shown in FIG. 3. Instead of calling function1 and passing an int and a double as shown in FIG. 3, the system calls function1 by passing a pointer (&ARG) 604 to a data structure stored in memory 610 including the int and double parameters. Because the system passes a pointer 604 to the data structure, function1 608 can access or translate the variables stored inside the data structure directly or by "unpacking" them, as shown in the function1 code. Function1 returns a void type 606, but assigns the return value to a member of the data structure. Because the data structure is passed as a pointer, modifications to the return value are preserved in memory 610, allowing the main function 602 to obtain the return value through the passed data structure & ARG.

Similarly, the main function 602 calls function2 616 and passes a pointer (&ARG) 612 to the data structure. Function2 accesses, translates, or "unpacks" the required values from & ARG and assigns the return value to one or more member of the data structure. Function2 returns a void 614, but as with Function1, the main function 602 can obtain the return value from ARG because it was passed by reference, so the changes that Function2 makes to ARG are available to the main function 602.

Embodiments within the scope of the present disclosure may also include tangible computer-readable storage media for carrying or having computer-executable instructions or data structures stored thereon. Such computer-readable storage media can be any available media that can be accessed by a general purpose or special purpose computer, including the functional design of any special purpose processor as discussed above. By way of example, and not limitation, such computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. Those skilled in the art will readily recognize various modifications and changes that may be made to the principles described herein without following the specific example embodiments and applications illustrated and described herein, and without departing from the spirit and scope of the disclosure.

We claim:

1. A computer-implemented method of obfuscating by a common function, the method causing a computing device to perform steps comprising:
    identifying a set of functions in source code;
    generating a transformed set of functions by transforming each function of the set of functions to accept a uniform set of arguments and return a uniform type;
    merging the transformed set of functions into a single recursive function;
    eliminating references to a stack; and
    translating recursive function calls to push a virtual stack.

2. The computer-implemented method of claim 1, wherein the single recursive function allocates memory in a heap.

3. The computer-implemented method of claim 2, wherein the stack contains a pointer to the allocated memory in the heap.

4. The computer-implemented method of claim 2, wherein the single recursive function creates the virtual stack in the heap.

5. The computer-implemented method of claim 4, the method further causing the computing device to explicitly manage the virtual stack by pushing variables on to and popping variables off from the virtual stack.

6. The computer-implemented method of claim 1, wherein transforming each function comprises:
   creating a structure type for each function of the set of functions, wherein the structure contains an element for each parameter passed to the function and an element for the return type of the function; and
   modifying each function of the set of functions so that the functions in the set share the same return type and the same parameter type, wherein the parameter type is the structure type or a pointer to the structure type.

7. A system for converting source code having a set of functions, the system comprising:
   a processor;
   a module controlling the processor to identify a set of functions in source code;
   a module controlling the processor to generate a transformed set of functions by transforming each function of the set of functions to accept a uniform set of arguments and return a uniform type;
   a module controlling the processor to merge the transformed set of functions into a single large function; and
   a module controlling the processor to replace calls to each of the identified set of functions with a corresponding call to the single large function,
   wherein one argument in the uniform set of arguments indicates a function within the set of functions to be executed.

8. The system of claim 7, wherein the single large function accepts a single argument having a structure type, wherein the structure type contains an element for each argument of each function in the identified set of functions.

9. The system of claim 7, wherein the single large function is recursive.

10. A system for converting source code having a set of functions, the system comprising:
    a processor;
    a module controlling the processor to identify a set of functions in source code;
    a module controlling the processor to generate a transformed set of functions by transforming each function of the set of functions to accept a uniform set of arguments and return a uniform type;
    a module controlling the processor to merge the transformed set of functions into a single large function;
    a module controlling the processor to replace calls to each of the identified set of functions with a corresponding call to the single large function; and
    a module controlling the processor to replace function calls in the source code with a jump instruction to a specific location within the single large function.

11. A computer-readable storage medium storing instructions which, when executed by a computing device, cause the computing device to execute certain steps, the instructions recursively accessing a common function created by steps comprising:
    identifying a set of functions in source code;
    transforming each function of the set of functions to have a uniform set of arguments and a uniform return value; and
    merging the set of functions into a common function,
    wherein the instructions contain multiple embedded common functions.

12. The computer-readable storage medium of claim 11, wherein the common function is embedded in the instructions.

13. The computer-readable storage medium of claim 11, wherein the common function is stored separately from the instructions.

14. A system for obfuscating source code by a common function, the system comprising:
    a processor;
    a module that controls the processor to identify a set of functions in source code;
    a module that controls the processor to generate a transformed set of functions by transforming each function of the set of functions to accept a uniform set of arguments and return a uniform type;
    a module that controls the processor to merge the transformed set of functions into a single large function; and
    a module that controls the processor to replace function calls in the source code with a jump instruction to a specific location within the single large function.

15. The system of claim 14, wherein one argument in the uniform set of arguments indicates a function within the set of functions to be executed.

16. The system of claim 14, wherein function calls to one of the set of functions include direct and indirect calls.

17. The system of claim 14, wherein the single large function is recursive.

* * * * *

UNITED STATES PATENT AND TRADEMARK OFFICE
CERTIFICATE OF CORRECTION

PATENT NO. : 8,645,930 B2  
APPLICATION NO. : 12/651953  
DATED : February 4, 2014  
INVENTOR(S) : Christopher Arthur Lattner et al.

Page 1 of 1

It is certified that error appears in the above-identified patent and that said Letters Patent is hereby corrected as shown below:

In the Claims

Column 14, Line 19, Claim 11: "into a common" should read --into the common--.

Signed and Sealed this  
Second Day of September, 2014

Michelle K. Lee  
*Deputy Director of the United States Patent and Trademark Office*